INVENTORS
RICHARD E. SWARTS
BERT V. TIBLIN
BY
Arthur H. Serrell
ATTORNEY ns patent office 3,171,213
Patented Mar. 2, 1965

3,171,213
ELECTROLYTIC TILT SENSOR
Richard E. Swarts, Northport, and Bert V. Tiblin, Huntington, N.Y., assignors to Sperry Rand Corporation, Great Neck, N.Y., a corporation of Delaware
Filed Apr. 13, 1962, Ser. No. 187,233
5 Claims. (Cl. 36—206)

This invention relates to an electrical tilt sensor in which the level reference component is provided by an electrolytic liquid of the surface wetting, concave meniscus, resistive type. The improved sensor operates over a relatively wide angular range up to substantially one hundred and eighty degrees to vary its conductivity depending on the area ratio between the wetted faces of a pair of related electrical terminals and the proportional volume of the resistive liquid between the wetted faces of the pair of terminals and a central terminal.

The tilt body or member of the improved sensor provides a closed chamber that is approximately half filled with the reference level of electrolytic fluid. The conductive elements of the improved sensor include a central electrical terminal with a face of fixed area wetted by the liquid throughout its operating range. The other conductor is provided by a pair of terminals arranged in opposed angular relation in a nonconductive body of the sensor and in fixed spaced relation to the axial conductor to provide equal face areas wetted by the liquid when the body is free of tilt about its axis. In the improved sensor, the conductive terminals move with the body in relation to the liquid as the body changes tilt throughout its effective range.

An object of the present invention is to provide a tilt sensor of the character described whose electrical conductivity is preferably linear over a relatively wide angular tilt range up to approximately 180°.

A feature of the invention is the provisions of a tilt sensor of the liquid level type in which a closed chamber contains an electrolytic liquid of the surface wetting, concave meniscus, resistive type to the approximate level of the axis.

Another feature is provided by a central conductive terminal structure for the improved sensor that provides a face of fixed area that is wetted by the liquid and its meniscus regardless of the tilt condition of the sensor.

A further feature is provided by the pair of conductors or terminals included in the sensor to vary its conductivity depending on the area ratio between the respective faces thereof wetted by the liquid and the proportional volume of the resistive liquid between the wetted terminals and the central terminal.

Other objects, features and structural details of the invention will be apparent from the following description when read in relation to the accompanying drawing in which.

Figure 1:
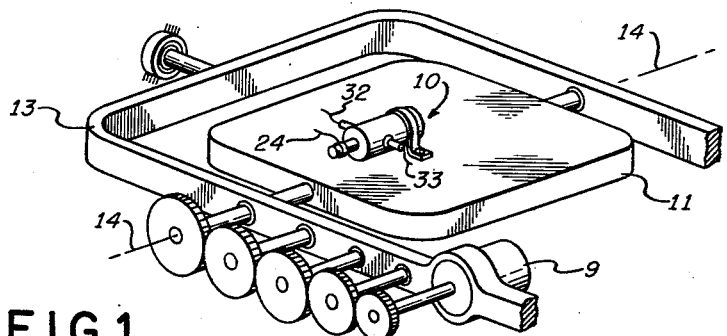
FIG. 1 is a perspective view showing the improved sensor mounted for use in measuring the tilt of a gimbal mounted table about a horizontal axis.

The improved electrical tilt sensor of the liquid level type is linearly accurate over a relatively wide angular tilt range. As shown in FIG. 1, the sensor generally indicated at 10 is mounted on a table 11 that is supported by a gimbal ring 13 for movement about a horizontal axis 14 through such a tilt range. Here, the tilt null of the sensor corresponds to a level condition of the table 11 about axis 14. As shown, the body or chambered member of the sensor 10 fixed to the table 11 moves through an angular range about axis 14 that corresponds to the motion of the table 11 when driven by a servo 9 mounted on the gimbal through connecting reduction gears. As the tilt null of the improved sensor depends on a liquid whose level corresponds to that of axis 14, its tilt range is limited to an angle approximating one hundred and eighty degrees. The angular tilt range of the improved sensor is accordingly relatively wide.

Figure 2:
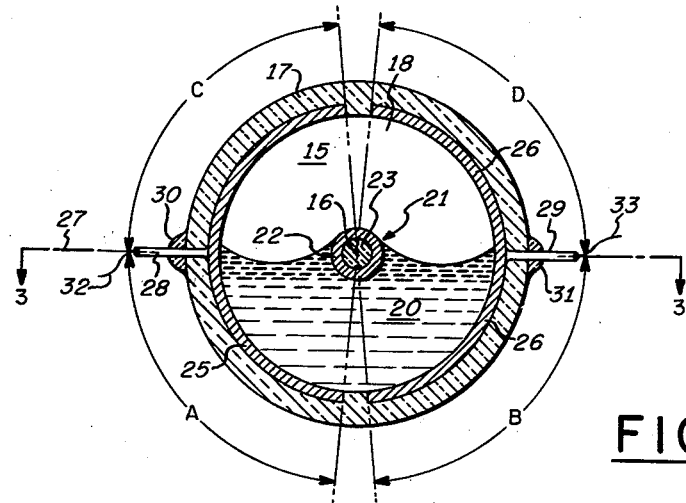
FIG. 2 is an enlarged transverse section view of the improved sensor taken on line 2—2, FIG. 3.
Figure 3:
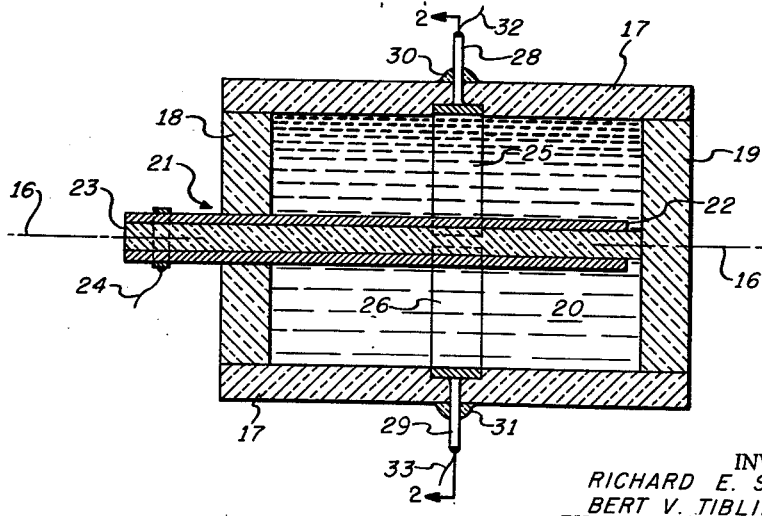
FIG. 3 is an enlarged longitudinal section view taken on line 3—3, in FIG. 2.

In the enlarged views of the sensor shown in FIGS. 2 and 3, a closed liquid chamber of symmetrical internal configuration in relation to its tilt axis 16 is indicated at 15. To provide the closed end cylindrical chamber 15, the body of the sensor is preferably constructed of nonconductive material such as a glass tube 17 with glass end caps 18 and 19 fused thereto. The sensor is mounted as represented in FIG. 1 with the tilt axis 16 thereof horizontal and with its body fixed to move about the axis 16 in relation to an electrolytic liquid 20 of the surface wetting, concave meniscus, resistive type that approximately half fills the chamber 15. The curved surface of the liquid and its meniscus at the central terminal provides the reference level from which tilt is measured. As an electrolyte, the liquid also is a resistive conductor of electrical energy between the conductive terminals included in the sensor.

One of these terminals is indicated as a central terminal 21 having a face symmetrical to the axis 16 of fixed area that is wetted by the liquid 20 and its meniscus as shown in FIG. 2. Terminal 21 is preferably provided by a tube 22 whose fixed area cylindrical surface in the chamber 15 is symmetrical to the axis 16. The tube 22 is suitably fixed to the body of the sensor through end cap 18 and moves with the body as its tilts about axis 16 without changing its fixedly wetted relation to the liquid 20. It will be noted as shown in FIG. 2, that the curvature of the meniscus of this type of liquid is changed by the central terminal of the sensor so that the face of the terminal is completely wetted by the liquid. The face area of the terminal 21 wetted by the liquid 20 accordingly remains fixed as the body and terminal move together about axis 16. The longitudinal axis of tube 22 coincides with the axis of the body as well as the longitudinal axis of the chamber 15. As shown in FIG. 3, the axial dimension of the tube 22 is less than the axial dimension of the chamber so that the end of tube 22 within chamber 15 is spaced from the inside wall of cap 19 to enable the liquid to be inserted therein after parts 17, 18, 19 and 22 are assembled. An insulative rod 23 fitting the tube 22 closes the assembly after the liquid 20 is placed in the chamber 15. Electrical lead 24 is suitably connected to the portion of the conductive tube or terminal 21 extending exteriorly of the body of the sensor.

The other electrical terminals or conductors of the improved sensor are respectively indicated at 25 and 26. This noted pair of terminals are fixed to the tube 17 of the body of the sensor in the chamber 15 at a fixed distance or radial spacing from the central terminal 21. The terminals 25 and 26 are further arranged in opposed angular relation with respect to one another having corresponding faces of fixed area with uniform axial and angular dimensions. Equal face areas of the terminals 25 and 26 are wetted by the liquid 20 when the body is tilt free about its axis 16 as shown in FIG. 2, where the level provided by the surface of the liquid is indicated at 27. As shown in FIGS. 2 and 3, the terminals 25 and 26 are paired arcuate strips of a curvature that conforms to the curved cylindrical wall of the chamber. In the illustrated embodiment of the invention, the strips are fused into the wall of the chamber 15 and include wire connections 28 and 29 that extend through the wall of the glass tube 17. The joint between the noted parts is sealed by means of the glass beading indicated at 30 and 31. Electrical leads 32 and 33 are shown connected to the respective exteriorly extending portions of the strip connections 28 and 29.

The sensor is mounted with relation to axis 16 so that equal angular lengths A and B of the strip conductors 25 and 26 are wetted by the liquid when the sensor is free of tilt about the axis. As the axial widths of the strips correspond, the wetted areas and the proportional volume of the resistive liquid between the wetted face areas of terminals 25, 26 and the central terminal 21 are identical so that the electrical conductivity of the sensor is balanced in relation to the respective leads 32 and 33 under the noted condition. As the chamber member or body of the sensor tilts about the axis 16 from a tilt free condition, the body and terminals move about the axis in relation to the level provided by the liquid 20 over a relatively wide angular range of approximately one hundred and eighty degrees as determined by the sum of the angles A and B in FIG. 2. This angle is less one hundred and eighty degrees by the small angle required to separate the strip conductors 25 and 26. The sensor operatively reverses its output sense depending on the direction of tilt of the body of the sensor about axis 16 from a tilt free condition. As tilt occurs, the sensor also varies its conductivity depending on the area ratio between the respective wetted surfaces of the pair of terminals 25 and 26 and the proportional volume of the liquid between the central and paired terminals. Where the strip conductors 25 and 26 are of an angular dimension A and B only, with clockwise tilt of the sensor about axis 16, the area of the strip 26 wetted by the fluid would remain constant and the area of strip 25 would decrease as the same moves in relation to the surface of the liquid so that it is no longer wetted thereby. Accordingly, the conductivity of the sensor to lead 32 decreases in relation to its conductivity to lead 33. With counterclockwise tilt about the axis 16, the conductivity of the sensor reverses as the wetted area of conductor 26 decreases with relation to the conductor 25. As shown in FIG. 2, where the angular dimension A and C of terminal 25 is the same as the angular dimension B and D of terminal 26, and angles C and D are equal to the angles A and B, both the wetted and non-wetted face areas of the paired terminals 25 and 26 are equal when the body of the sensor is tilt free about its axis 16 in relation to the liquid 20. Here, through the operative range of the sensor, the wetted area of one of the paired terminals increases as the other decreases depending on the direction of tilt to obtain a desired linear output.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. An electrical tilt sensor of a liquid level type with a relatively wide angular tilt range including a nonconductive body having a closed chamber of symmetrical internal configuration about an axis corresponding to the horizontal axis of tilt of the sensor, a liquid of a surface wetting, concave meniscus, resistive, electrolytic type filling the chamber to the approximate level of the tilt axis, a conductive terminal of the axial configuration of the chamber fixed to the body and centrally arranged in the chamber in coaxial relation to the axis having a face of fixed area wetted by the liquid and its meniscus, and a pair of conductive terminals of the axial configuration of the chamber and central terminal fixed to the body having corresponding faces of fixed area with uniform axial and angular dimensions arranged in the chamber in opposed angular relation at a fixed distance through the resistive liquid from the central terminal and with equal face areas wetted by the resistive liquid when the body is free of tilt about its axis, the electrical conductivity of the sensor varying over a relatively wide angular range of tilt about the tilt axis depending on the ratio between the respective face areas of the pair of terminals wetted by the liquid and the proportional volume of the resistive liquid between the wetted face areas of the pair of terminals and the central terminal.

2. A sensor of the character claimed in claim 1, in which the angular dimension of the pair of conductive terminals is such that when the body is level about its axis corresponding halves of the face areas are wetted and non-wetted.

3. A sensor of the character claimed in claim 2, in which the angular dimension of the pair of conductive terminals is substantially 180 degrees, and the tilt range of the level corresponds to the angular dimension.

4. A sensor of the character claimed in claim 1, in which the central terminal is a closed tube whose axial dimension is less than the axial dimension of the chamber.

5. A sensor of the character claimed in claim 1, in which the liquid chamber is a closed cylinder with the axis of the sensor corresponding to the longitudinal axis of the cylinder, and the faces of the central and paired terminals are cylindrical with the fixed distance between the face areas through the liquid being radial.

References Cited in the file of this patent

UNITED STATES PATENTS

| 2,592,941 | Moore | Apr. 15, 1952 |
| 2,713,727 | Balsam | July 26, 1955 |

FOREIGN PATENTS

| 558,616 | Great Britain | Jan. 13, 1944 |